Patented June 3, 1947

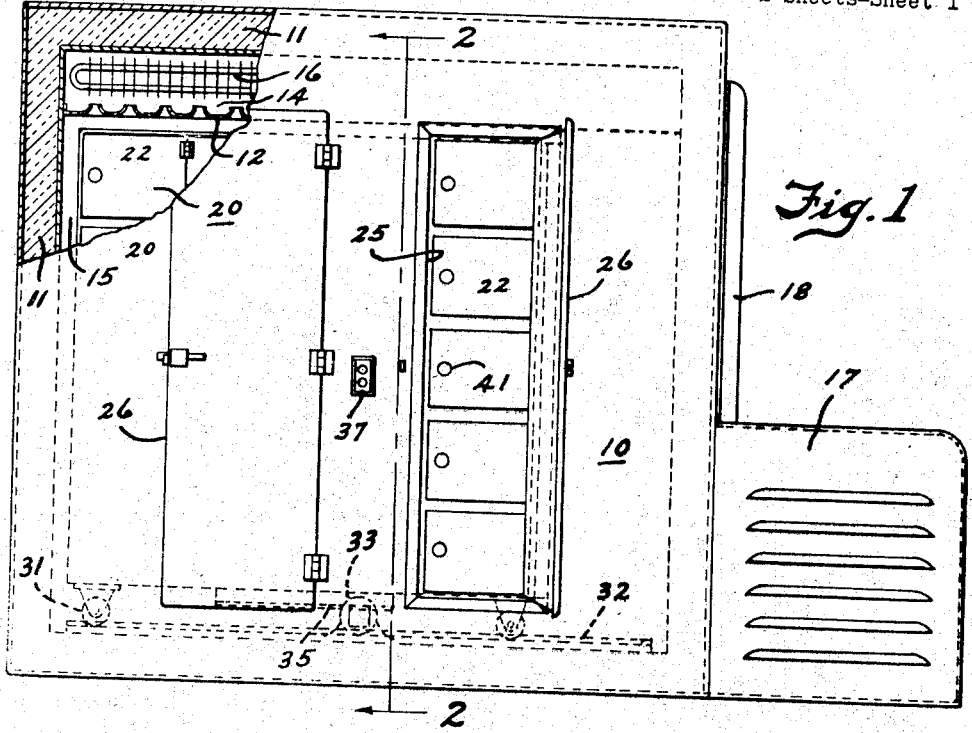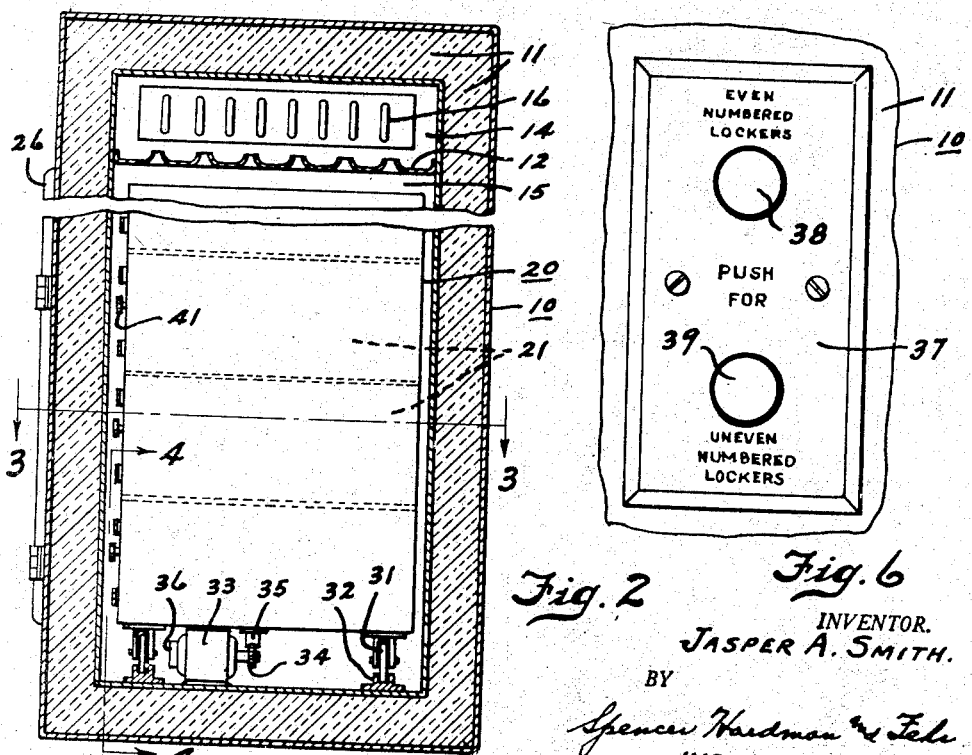

2,421,439

UNITED STATES PATENT OFFICE 2,421,439

REFRIGERATED CABINET WITH SELECTIVE ACCESS

Jasper A. Smith, Oakwood, Ohio, assignor to General Motors Corporation, Dayton, Ohio, a corporation of Delaware Application July 28, 1945, Serial No. 607,599

5 Claims. (Cl. 62—89)

This invention relates to refrigerating apparatus and particularly to that type of apparatus now commonly referred to as a frozen food locker cabinet.

In frozen food storage locker cabinets of the portable type adapted to be installed in a room of a business establishment, including a refrigerated chamber having a plurality of compartments or lockers therein intended to be rented or leased by individual users, it has been the practice to provide a separate insulated door for the access opening of each individual locker. This practice of providing separate insulated doors for each compartment, drawer or locker complicates the cabinet construction and also materially increases the manufacturing cost thereof.

An object of my invention is to provide an improved frozen food storage locked cabinet.

Another object of my invention is to minimize the number of insulated doors required on a frozen food locker cabinet to thereby reduce the manufacturing cost thereof.

A further object of my invention is to provide means for moving either of two lockers or compartments arranged side by side, or either of two vertical tiers thereof in alignment selectively with one insulated door on a frozen food locker cabinet whereby this one door serves the function of two doors ordinarily provided on such cabinets.

In carrying out the foregoing objects it is a still further and more specific object of my invention to provide a frozen food storage locker cabinet with a movable locker unit in the refrigerated chamber thereof, which unit is of a length less than the width of one locker whereby the space at one end of the chamber may receive one locker of the unit or one vertical tier thereof when the movable unit is shifted to position, another locker or another vertical tier thereof in alignment with the cabinet door opening.

Further objects and advantages of the present invention will be apparent from the following description, reference being had to the accompanying drawing, wherein a preferred form of the present invention is clearly shown.

In the drawings:

Fig. 1 is a front view of a frozen food storage locker cabinet having a part thereof broken away and embodying the present invention;

Fig. 2 is an enlarged vertical sectional view of the cabinet taken on the line 2—2 of Fig. 1;

Fig. 6 is a fragmentary view showing a push button switch employed for energizing a motor utilized to move the locker unit within the cabinet.

Figure 3:
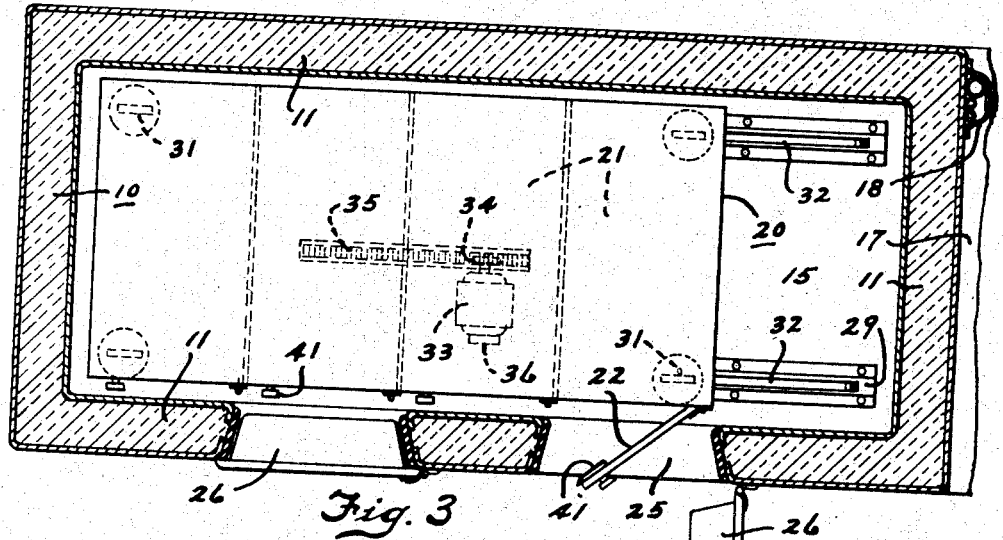
Fig. 3 is a horizontal sectional view of the cabinet taken on the line 3—3 of Fig. 2.

In frozen food storage locker cabinets of the type disclosed in the accompanying drawings and as distinguished from large locker plants, where a special building is constructed to enclose the plant, there is usually a space provided at each end of the locker unit within the refrigerated chamber of the cabinet for the circulation of air around the lockers or locker unit. Since my invention is particularly directed to reducing the number of insulated doors on a locker cabinet, by slightly increasing the space within the refrigerated chamber adjacent one end of the locker unit together with providing for the shifting of the locker unit longitudinally within the chamber I can obtain selective access to either of two lockers or compartments arranged in a horizontal row or to either of two vertical tiers thereof through one opening in a wall of the cabinet.

Referring now to the drawings I have shown a refrigerating apparatus comprising a cabinet 10 having insulated walls 11 enclosing or forming a chamber therein. This chamber is divided, by a reticulated partition 12, into a cooling unit chamber 14 and a locker unit chamber 15. Above the partition 12 there is mounted, in any suitable or desirable manner, an evaporator 16 of a refrigerating system. Operation of the refrigerating system causes the evaporator 16 to cool and cause circulation of air within the chamber enclosed by the insulated walls 11 as is conventional in the art. If desired forced circulation of the air may be employed. The temperature within the chamber 15 is of course maintained sufficiently low to freeze and retain food products in a frozen state. A ventilated enclosing casing 17 attached to the end of cabinet 10 may house the refrigerant liquefying and condensing unit of the refrigerating system, and a shield 18 may cover and protect the refrigerant conduits extending between the evaporator 16 and the unit mounted in the casing 17. A movable unit or structure 20 disposed within chamber 15 comprises a plurality of integral lockers or compartments 21 each having a locked door 22. In the present showing there are four vertical tiers of lockers 21 comprising the unit 20 and forming horizontal rows of lockers. It is to be understood that any desired number of lockers may be formed integral with one another or secured together to form the unit 20. The walls of lockers 21 may be closed or they may be vented as is desired or conventional in the art. Cabinet 10 is provided with two openings 25 in the front wall 11 thereof and these openings are each normally closed by an insulated door 26. The front of cabinet 10 also has closed wall portions adjacent the doors 26 which are of substantially the same width as the width of the openings 25.

Figure 4:
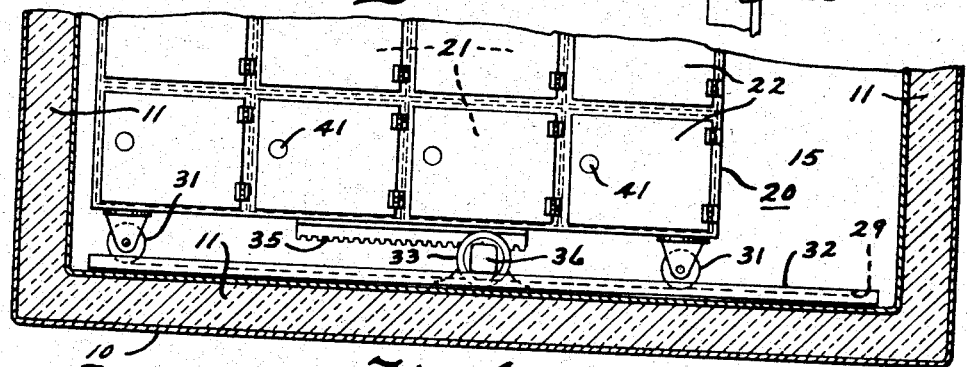
Fig. 4 is a fragmentary vertical sectional view of the cabinet taken on the line 4—4 of Fig. 2 showing the locker unit in one position.
Figure 5:
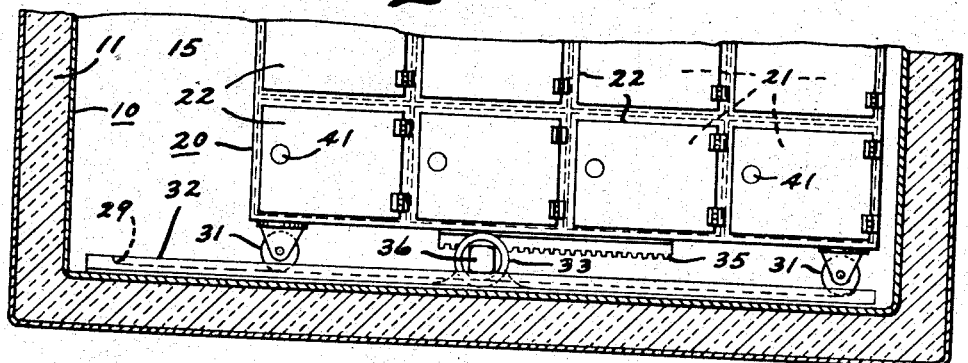
Fig. 5 is a view similar to Fig. 4 showing the locker unit in another position.

It will be noted that the locker unit 20 is positioned in the left hand portion of chamber 15 of cabinet 10 in Figs. 3 and 4 thus leaving a space substantially equal to the width of one locker 21 at the right hand end or portion of chamber 15 into which one vertical tier of lockers 21 of unit 20 may be moved. The locker unit 20 is designed so that when it is in the left hand portion of chamber 15 certain alternate vertical columns or tiers of lockers or compartments 21 are in alignment with the door openings 25 and doors 26 while other alternate tiers of lockers are disposed behind the closed wall portions of the cabinet front. When the unit 20 is moved into the right hand portion of chamber 15 these other alternate vertical tiers of lockers 21 will be in alignment with the door openings 25 and insulated doors 26 while the first mentioned alternate tiers of lockers are disposed behind the closed wall portions of the cabinet front. In order to permit shifting or moving of the locker unit 20 back and forth longitudinally within chamber 15 I mount the same upon rollers 31 which roll in grooves of tracks 32 secured to the bottom wall of chamber 15. At each end of the tracks 32 there is provided a raised portion or termination point 29 (see Fig. 3) of the groove therein and which is adapted to be engaged by the rollers 31. The locker unit 20 may be manually shifted by suitable cranks, levers, or the like, or it may be moved through suitable electrically operated means. For the sake of simplicity and illustration I have disclosed an electric motor 33 mounted on the bottom wall of chamber 15 intermediate the ends thereof. Teeth provided on a gear 34 which is secured to the end of the shaft of motor 33 mesh with teeth provided on a pinion rack 35 secured to the underside of the locker unit 20. Motor 33 may be of the conventional reversible type wherein electric current energizing certain windings thereof at one time will cause rotation of the motor shaft and consequently gear 34 in one direction and electric current energizing certain other windings of the motor at another time will cause rotation of the motor shaft in the opposite direction. I therefore employ motor 33 to shift or move the locker unit 20 a distance equal to the width of one locker of the horizontal row thereof, back and forth within the refrigerated chamber 15 to the positions within cabinet 10, as illustrated in Figs. 4 and 5 of the drawings. A counting or some such similar device 36 may be associated with the shaft of motor 33 for limiting the revolutions thereof to that required to move the locker unit 20 only from one end to the other of chamber 15 on the tracks 32 intermediate the stops 29. This counting device 36 preferably may include a means for breaking the circuit to the motor 33 when the locker unit 20 reaches the end stops 29 of the tracks 32. In order to energize the circuit to the motor I provide a conventional push button switch (not shown) but which is mounted in the front wall of cabinet 10 and is concealed by a plate 37 (see Figs. 1 and 6). Push buttons 38 and 39, provided for actuating the electric switch, project through the plate 37 and are readily accessible at the front of the cabinet so as to cause operation of the apparatus as will be presently described.

In the present disclosure and particularly as shown in Figs. 1 and 3 of the drawings the alternate lockers 21 of the horizontal rows thereof or the alternate vertical tiers thereof in the locker unit 20, which are in horizontal alignment with the door openings 25 and insulated doors 26 may bear even numbers and the adjacent or other alternate lockers 21 of the horizontal rows or vertical tiers thereof in the unit 20 disposed in alignment with the closed wall portions of the cabinet front may bear uneven numbers. Thus the plate 37, through which buttons 38 and 39 of the electric switch project, may have inscription thereon indicating which button is to be pushed to bring a certain locker of a horizontal row thereof or certain vertical tiers of lockers into alignment with the door openings 25 and doors 26. The door 22 which affords access to the interior of any one individual locker 21 is preferably provided with a conventional combination lock, indicated at 41, to afford each user of the apparatus protection for the contents of his locker.

The refrigerant liquefying and circulating unit contained in the casing 17 may be operated in any suitable or conventional manner preferably in response to temperature changes within chamber 15 for causing the evaporator 16 of the refrigerating system to maintain chamber 15 at a sufficiently low temperature to freeze food products in the lockers 21 or to maintain food products stored therein in a frozen state. In the use of the apparatus the user of any one individual locker 21 upon approaching the cabinet 10 would push either button 38 or 39 depending upon the number of the user's locker. For example, if the user's locker is an even numbered one and button 38 is pushed no movement of unit 20 will occur, since the even numbered lockers are already in horizontal alignment with the door openings 25 and doors 26, and the switch contained in the counting device 36 is open with respect to the switch contacts closed by button 38. Access can therefore be had to the user's locker 21 by opening door 26, unlocking the combination lock 41, on the locker or compartment door 22, and thereafter moving the door 22 into the cabinet door opening 25 (see Fig. 3). However, if the user's locker is an uneven numbered one and the button 39 is pushed, with the switch contained in the counting device 36 closed, the circuit will be completed through the device 36 to energize motor 33. Rotation of the shaft of motor 33 will rotate gear 34 which will impart force to the pinion rack 35 to move the locker unit 20 to the right hand side of the refrigerated chamber 15, as shown in Fig. 5, so that the other alternate lockers 21 of the rows or tiers thereof are in horizontal alignment with the door openings 25 and doors 26. Access may then be had to this user's locker 21 by opening the door 26, unlocking the combination lock 41, on door 22, and swinging this door into the cabinet door opening 25. It is to be understood that the counting device 36 will control the revolutions of gear 34 to move the rack member 35 and consequently locker unit 20 the proper distance in either direction to insure alignment of certain tiers of lockers 21 with the door openings 25 and of certain other or alternate tiers of lockers with the closed wall portions of the cabinet front selectively or alternatively. The termination point 29 of the groove in tracks 32 at each end of the tracks is abutted by the rollers 31 when unit 20 is moved to either end of the tracks. Thus when the counting device 36 breaks the circuit to motor 33, rollers 31 engage the stops 29 to position the locker unit 20 at one end or the other of the refrigerated chamber 15. In either position of unit 20 there is provided, between the end wall of chamber 15 and the unit a space of sufficient size to permit free circulation of air, cooled by the evaporator 16, downwardly from chamber 14 to a point beneath the locker unit 20. As before stated one of these spaces is of a width substantially equal to the width of one locker 21 so as to permit shifting of unit 20 as described. The space between the locker unit 20 and walls 11 of chamber 15 at the front and at the rear of the lockers 21, also permits free circulation of cooled air downwardly along the front and back of the rows of lockers. In this manner the end and front portions of the lockers 21 are effectively cooled. It is to be understood that flexible seals or the like may, if desired, be provided around the cabinet door openings 25 to engage the locker unit 20 and thereby prevent the escape of cold air from that portion of chamber 15 beyond the locker or lockers to which access is being had. The electrical circuit and the electrical elements, their construction and their operation are conventional in the art to which they belong and serve only in the present disclosure as means for illustrating the shifting of locker unit 20 within the refrigerated chamber 15. A safety device may, if desired, be included in the electrical circuit of the present apparatus and may be actuated by the opening and closing of any one of the doors 26 to insure that when a user has a cabinet door 26 and a locker door 22 opened, another user cannot cause shifting of the unit 20 within the refrigerated chamber 15.

From the foregoing it will be seen that I have provided an improved frozen food storage locker cabinet of the type to be installed in a room of a building and wherein the number of doors on the cabinet have been minimized to thereby reduce manufacturing costs. By providing a shiftable locker unit within the refrigerated chamber of the cabinet one door at the front of the cabinet serves to afford access to one locker of a horizontal row thereof or to one vertical tier of lockers when the unit is in one position within the chamber and when the locker unit is shifted to another position this same door affords access to another locker of the horizontal row thereof, or to another vertical tier of lockers. Thus one insulated door on the cabinet eliminates the necessity of providing a door on the front of the cabinet for each of the plurality of lockers of a horizontal row thereof.

While the form of embodiment of the invention as herein disclosed, constitutes a preferred form, it is to be understood that other forms might be adopted, as may come within the scope of the claims which follow.

What is claimed is as follows:

1. A refrigerating apparatus comprising a cabinet including a plurality of insulated walls forming a chamber therein, a refrigerating system associated with said cabinet including means for cooling said chamber, a movable unit within said chamber comprising a plurality of integral tiers of lockers forming horizontal rows thereof, the front of said cabinet having an opening therein, a door for the opening in said cabinet front, the number of tiers of lockers in said chamber being one less than that to fill the horizontal rows of lockers whereby said unit is spaced from an end wall of said chamber a distance substantially equal to the width of a tier of lockers, one of said tiers of lockers being in alignment with the opening in said cabinet front and an adjacent tier of lockers being out of alignment therewith, and means for shifting said unit toward said chamber end wall to move said adjacent tier of lockers into alignment with the opening in said cabinet front and to move said one tier of lockers out of alignment therewith.

2. A refrigerating apparatus comprising a cabinet including a plurality of insulated walls forming a chamber therein, a refrigerating system associated with said cabinet including means for cooling said chamber, a movable unit within said chamber comprising a plurality of integral tiers of lockers forming horizontal rows thereof, the front of said cabinet having a plurality of spaced apart openings therein, a door for each of the openings in said cabinet front, the number of tiers of lockers in said chamber being one less than that to fill the horizontal rows of lockers whereby said unit is spaced from an end wall of said chamber a distance substantially equal to the width of a tier of lockers, alternate tiers of lockers being in alignment with the openings in said cabinet front and the tiers of lockers adjacent to said alternate tiers thereof being out of alignment with the openings in said cabinet front, and means for shifting said unit toward said chamber end wall to move said alternate tiers of lockers out of alignment with the openings in said cabinet front and to move said tiers of lockers adjacent to said alternate tiers thereof into alignment therewith.

3. A refrigerating apparatus comprising a cabinet including a plurality of insulated walls forming a chamber therein, a refrigerating system associated with said cabinet including means for cooling said chamber, a horizontal row of lockers within said chamber, the front of said cabinet having an opening therein and a closed wall portion on each side of the opening, each closed wall portion of the front of said cabinet and the opening therein being at least of a width substantially equal to the width of a locker, a door for the opening in said cabinet front, one of said lockers being in alignment with the opening in said cabinet front and an adjacent locker being in alignment with one of said closed wall portions thereof, the number of lockers in said row thereof being one less than that to fill the row whereby the space in said chamber behind the other of said closed wall portions is normally vacant and adapted to receive said one locker, and means for shifting said lockers within said chamber to move said one locker out of alignment with the opening in said cabinet front and to move said adjacent locker into alignment therewith.

4. A refrigerating apparatus comprising a cabinet including a plurality of insulated walls forming a chamber therein, a refrigerating system associated with said cabinet including means for cooling said chamber, a movable unit within said chamber comprising a horizontal row of integral lockers, the front of said cabinet having a plurality of openings therein and a closed wall portion on each side of each opening, each closed wall portion of the front of said cabinet and each opening therein being at least of a width substantially equal to the width of a locker, a door for each opening in said cabinet front, alternate lockers of the row thereof being in alignment with the openings in said cabinet front and the lockers adjacent to said alternate lockers being in alignment with the closed wall portions thereof, the number of lockers in said unit being one less than that to fill the row whereby the space in said chamber behind one closed wall portion of said cabinet front is vacant and adapted to receive one of said alternate lockers, and means for shifting said unit within said chamber to move said alternate lockers out of alignment with the openings in said cabinet front and to move said lockers adjacent to said alternate lockers into alignment therewith.

5. A refrigerating apparatus comprising a cabinet including a plurality of insulated walls forming a chamber therein, a refrigerating system associated with said cabinet including means for cooling said chamber, a row of lockers within said chamber each having an access side facing one wall of said cabinet, a movable closure member for the access side of each locker, said one cabinet wall having an opening therein and a closed wall portion on two opposite sides of the opening, each closed wall portion of said one cabinet wall and the opening therein being at least as large as one of the locker closure members, a door for the opening in said cabinet wall, one of said lockers being in alignment with the opening in said cabinet wall and an adjacent locker being in alignment with one of said closed wall portions thereof, the number of lockers in said row thereof being one less than that to fill the row whereby the space in said chamber behind the other of said closed wall portions is normally vacant and adapted to receive said one locker, and means for shifting said lockers within said chamber to move said one locker out of alignment with the opening in said cabinet wall and to move said adjacent locker into alignment therewith.

JASPER A. SMITH.

REFERENCES CITED

The following references are of record in the file of this patent:

UNITED STATES PATENTS

| Number | Name | Date |
|---|---|---|
| 895,919 | Wailes | Aug. 11, 1908 |
| 2,076,173 | Cocks | Apr. 6, 1937 |